Aug. 25, 1953  R. W. GILBERT  2,650,348
INDUCTION GALVANOMETER
Filed Aug. 5, 1949
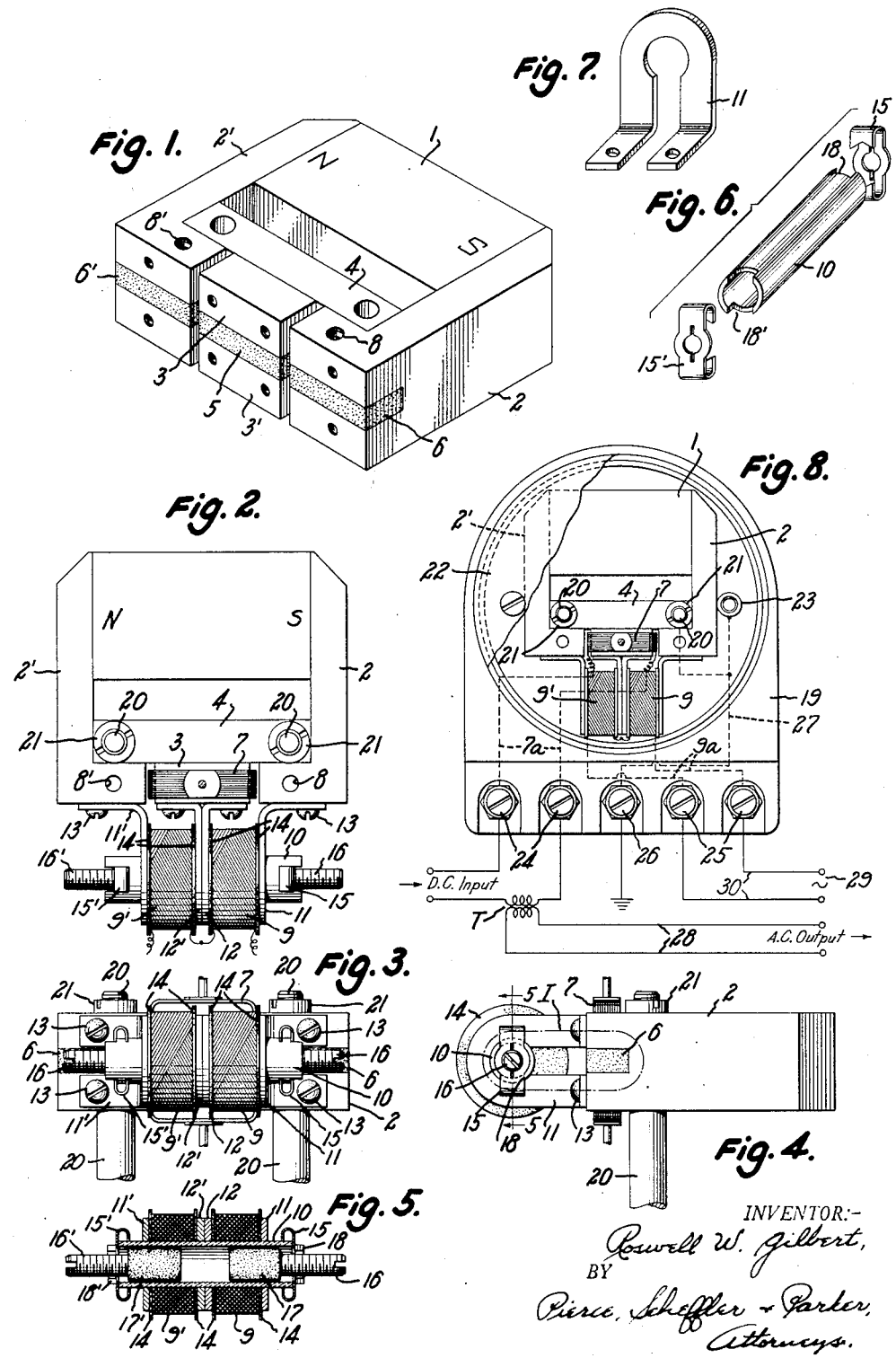
INVENTOR:—
Roswell W. Gilbert,
BY
Pierce, Scheffler & Parker,
Attorneys.

Patented Aug. 25, 1953

2,650,348

UNITED STATES PATENT OFFICE 2,650,348

INDUCTION GALVANOMETER

Roswell W. Gilbert, Montclair, N. J., assignor to Weston Electrical Instrument Corporation, Newark, N. J., a corporation of New Jersey Application August 5, 1949, Serial No. 108,812

16 Claims. (Cl. 324—120)

This invention relates to induction galvanometers, and more particularly to induction galvanometers with composite magnetic systems for improving the distribution of both the steady and the alternating magnetic flux.

The induction galvanometer is a sensitive direct current instrument which includes, in addition to the usual permanent magnet and pivoted movable coil, an alternating current field coil for introducing a ripple or alternating component into the magnetic field flux. When the pivoted coil is in the normal zero position, its inductance mutual to the alternating field is zero and no alternating potential is induced in the coil. When the coil is deflected from zero position by direct current, an alternating potential component proportional to the deflection angle and having a phase dependent upon the direction of displacement is induced in the movable coil. The induced alternating component is introduced into a load circuit by means of a transformer coupled to the direct current measuring circuit, and the energy amplification obtained, when the load impedance is matched to the coil impedance, is very high.

The induction galvanometer is described and claimed in my copending application Serial No. 558,754, filed October 14, 1944, which matured into Patent No. 2,486,641, on November 1, 1949. The present invention relates primarily to the magnetic field structure of the induction galvanometer, and to the electrical system for superposing a high frequency ripple or alternating magnetic flux upon the steady magnetic flux established by a permanent magnet or, if desired in special cases, an electromagnet.

Objects of the invention are to provide induction galvanometers, and magnetic field systems for induction galvanometers, which are characterized by separate flux paths for the steady and for the alternating magnetic flux. Objects are to provide induction galvanometers, and magnetic field systems for induction galvanometers, which have a soft iron path for the steady magnetic flux and a powdered iron path for the high frequency alternating magnetic flux. An object is to provide induction galvanometers in which the magnetic field systems include two air gaps in which the opposite sides of the moving coil are located, and which include a tunable high frequency field coil assembly adjustable to balance the alternating magnetic flux with respect to the physical center of the moving coil. An object is to provide an induction galvanometer having inserts of powdered iron bonded with resin set into the pole pieces and core of the permanent magnet field structure, a pair of field coils to be energized by a high frequency current, and brackets supporting the field coils from the pole pieces and core; the brackets being U-shaped and each constituting a part of a one-turn secondary energized by the associated field coil and effectively extending around a powdered iron insert.

These and other objects and the advantages of the invention will be apparent from the following specification when taken with the accompanying drawings, in which:

Fig. 1 is a perspective view of a composite magnetic field system embodying the invention;

Fig. 2 is a plan view of the essential elements of an induction galvanometer having a field system as shown in Fig. 1;

Fig. 3 is an end elevation of the same;

Fig. 4 is a side elevation of the same;

Fig. 5 is a fragmentary horizontal section through the high frequency coils and associated structure as seen on line 5—5 of Fig. 4;

Fig. 6 is an exploded perspective view of the insulating tube and associated resilient members which support the tunable high frequency field coils;

Fig. 7 is a perspective view of one of the brackets which support the high frequency coil assembly upon the magnetic field structure and which constitute part of a one-turn secondary for setting up a high frequency magnetic flux in the powdered iron section of the magnetic field structure; and Fig. 8 is a schematic view of an induction galvanometer and associated circuits.

The induction galvanometer is essentially an amplifying direct current-to-alternating current converter and, as stated in my prior patent, the alternating current energy developed in the moving coil increases with increasing frequency of the ripple or alternating magnetic flux. Conventional field structures of permanent magnet and soft iron pole piece type impose limitations upon the frequency of the ripple component of the magnetic flux as a point is reached at which the eddy current losses in the iron more than offset any advantage which might result from an increase in the frequency of the source energizing the alternating magnetic field. The present invention extends substantially the upper limit of the frequency of the alternating magnetic flux component which may be efficiently superposed upon the steady magnetic flux, and thereby increases to new orders of magnitude the amplification which may be effected in the conversion of minute direct currents into alternating currents.

In the drawings, the reference numeral 1 identifies a permanent magnet to which a pair of L-shaped bars 2, 2' of soft iron are cemented, welded or brazed. The short legs of the bars 2, 2' terminate in spaced, and preferably parallel, plane surfaces which constitute the polar surfaces of the permanent magnet structure. A core of soft iron, comprising vertically spaced block sections 3, 3' is supported in the gap between the opposed short legs of bars 2, 2' by a bar 4 of non-magnetic material to which they are cemented, welded or brazed, and the bar 4 is located between the long legs of bars 2, 2' and cemented, welded or brazed to the inner surfaces of the short legs of the bars 2, 2'.

A rectangular block 5 of carbonyl iron powder bonded and insulated by a resin is located between the core sections 3, 3', and is cemented or otherwise bonded to the core sections 3, 3' and to the non-magnetic supporting bar 4. Blocks 6, 6' of iron powder bonded by a resin are located in slots cut in the short legs of the soft iron bars 2, 2' in alinement with the block 5, and are cemented or otherwise secured therein. The powdered iron inserts provide a path for a high frequency alternating magnetic flux, and the soft iron bars 2, 2' and soft iron core sections 3, 3' provide a path for the steady unidirectional magnetic flux established by the permanent magnet 1. The powdered iron inserts 5, 6, 6' have a depth, or dimension from outer to inner face, equal to that of the soft iron core segments, thereby affording a substantially uniform distribution of the high frequency magnetic flux in the air gaps. The thickness or vertical dimension of the powdered iron inserts is not limited to the illustrated value of approximately one-fourth the total thickness of the iron elements at the air gaps but could be made much smaller without loss of operating efficiency. For small size instruments such as the illustrated embodiment in which the total thickness of the pole pieces and of the core is about one-half inch, the thickness of the powdered iron inserts is not based upon the minimum cross-section which will carry the high frequency flux but is determined by practical considerations of molding, handling and convenience in assembly.

A coil 7 is pivotally supported in conventional manner by bearings, not shown, for angular deflection about a vertical axis extending through the center of the core segments 3, 3' and 5, the opposite sides of the coil being parallel and disposed in the rectilinear air gaps between the opposed plane surfaces of the core assembly and of the soft iron L-shaped bars 2, 2' and the associated powdered iron inserts. The coil assembly includes conventional springs and spring abutments, not shown, for introducing current into the coil, and for returning the coil to zero center position in the absence of a direct current input. The usual bridges, not shown, between which the coil 7 is pivotally supported, are mounted on the short legs of the bars 2, 2' by studs threaded into openings 8, 8' of the bars.

The high frequency field coil assembly for setting up a ripple or alternating magnetic flux in the powdered iron blocks 5, 6 and 6' includes a pair of multiturn coils 9, 9' on a tube 10 of insulating material which is supported upon the magnetic field structure by brass U-shaped brackets 11, 12 and 11', 12' respectively which have their ends secured to the pole pieces 2, 2', and to the core segments 3, 3', by screws 13. Insulating disks 14 are arranged between the coils 9, 9' and the supporting brackets.

Centrally apertured spring clips 15, 15' are resiliently retained upon the ends of the insulating tube 10 to form nuts through which are threaded screws 16, 16' upon which short cylinders 17, 17' of powdered iron in a resin binder are molded. The spring clamping arms of the clips 15, 15' are located in notches 18, 18' at the respective ends of the tube 10 to prevent inadvertent rotation of the spring clips when screws 16, 16' are turned to adjust the soft iron cores 17, 17'. Individual adjustment of the cores 17, 17' alters the effective inductances of the coils 9, 9' and thereby tunes them to resonance at a desired operating frequency.

The U-shaped brackets 11, 12 and 11', 12' have their outer ends seated upon soft iron sections of the magnetic field structure at opposite sides of the inserted powdered iron sections, and each bracket and associated soft iron support forms a one-turn secondary in which a high frequency current is induced by the high frequency coil 9 or 9' carried by that bracket. The paths of the high frequency currents in the secondary one-turn circuits are indicated in Fig. 4 by the broken line I and, since they extend around the powdered iron blocks, they set up a high frequency magnetic flux in the powdered iron. The high frequency currents pass around but not through the powdered iron blocks in view of their high electrical resistance, and the high frequency magnetic flux is confined to the powdered iron sections of the magnetic field system.

Each of the powdered iron cylinders 17, 17' extends only partially within its associated coil 9 or 9', and the individual adjustments of the screws 16, 16' increase or decrease the amount of powdered iron within the coil to alter its inductance and thereby change the operating frequency. Adjustment of both screws 16 and 16' simultaneously in the same direction serves to balance the flux distribution in the two air gaps in which the coil moves, thereby to prevent the generation of distortion products within the field structure.

The instrument assembly is supported upon a base 19 by shouldered studs 20 which have lower ends molded in the base and upper reduced diameter sections which extend through openings in the non-magnetic bar 4 and are threaded to receive clamping nuts 21. An inverted cup-shaped casing 22 is secured over the instrument assembly in conventional manner by studs 23 which have lower ends molded into the insulating base 19. The terminals of the instrument may be located at the back of the supporting base or, as illustrated, the terminals may be accessible from the front by extending the base 19 beyond the instrument-supporting section which is covered by the casing. A pair of input terminals 24 are connected by leads 7a to the moving coil 7, and a pair of field coil terminals 25 are connected to the high frequency coils 9, 9' by leads 9a. A ground terminal 26 is also provided on the base 19, and is connected by lead 27 to one of the studs 20 on which the instrument assembly is mounted and to one of the studs 23 which support the casing 22.

The direct current input circuit may include a thermocouple or other device for generating a minute voltage or current, for example of the order of a few microvolts or microamperes, which varies as a function of temperature, humidity, pressure or the like. The input circuit includes the primary winding of a transformer T which transfers the high frequency alternating current developed in coil 7 to an output circuit 28. A high frequency source 29 for energizing the field coils 9, 9' is connected across the terminals 25 by leads 30.

The method of operation is identical with that of the induction galvanometer described in the aforesaid prior patent. At zero direct current input, the alternating currents induced in the opposite sides of the coil 7 are exactly balanced, and the net alternating current in the moving coil 7 is zero. On deflection of coil 7 from zero center position by a direct current input, the alternating current induced in the coil 7 varies in magnitude and phase with angular extent and direction of the coil 7 displacement. As compared with the apparatus disclosed in the prior patent, the present invention provides an amplification of a substantially higher order in the direct current-to-alternating current power conversion effected by the induction galvanometer. Power conversion gains of the order of $10^8$ are possible and entirely practical when the magnetic field system includes separate unidirectional and alternating magnetic flux paths permitting efficient use of relatively high frequency alternating currents for energizing the field structure of the induction galvanometer.

The term "high frequency" is not used herein to designate frequencies in the radio spectrum range designated by the Federal Communications Commission as "high frequency," i. e. frequencies of from 3 to 30 megacycles. On the contrary, the term "high frequency" is employed to designate frequencies above the maximum frequency which can, with reasonable efficiency, set up an alternating magnetic flux in a solid soft iron core.

Good results have been obtained with a high frequency field excitation of 200 kilocycles per second, but other relatively high frequencies may of course be employed. When operating with a high frequency source of 200 kilocycles, the power input to the field coils 9, 9' developed high frequency currents of approximately 5 amperes in the one turn secondaries.

The invention is not limited to any particular frequency of the source developing the ripple magnetic flux component, or to any particular magnitude of the ripple magnetic flux and it is to be understood that various modifications which may occur to those familiar with the design and construction of electrical measuring and control apparatus fall within the spirit and scope of the invention as set forth in the following claims.

I claim:

1. An induction galvanometer of the type including a magnetic field structure having spaced polar surfaces between which a unidirectional magnetic flux is established, a coil supported for angular displacement in the gap between said polar surfaces in response to direct current traversing said coil, and means for superposing a high frequency alternating magnetic flux upon the unidirectional magnetic flux traversing said interpolar gap; characterized by the fact that said magnetic field structure includes in parallel between said spaced polar surfaces sections of soft iron and of high resistance ferromagnetic material providing substantially separate paths for the unidirectional magnetic flux and for the alternating magnetic flux respectively.

2. An induction galvanometer as recited in claim 1, wherein said magnetic field structure includes a permanent magnet, soft iron bars secured to said permanent magnet and having opposed portions terminating in said polar surfaces, said opposed portions of the soft iron bars being provided with slots extending parallel to the direction of the unidirectional magnetic flux therethrough, and inserts of high resistance ferromagnetic material in said slots and constituting the path for the alternating magnetic flux.

3. An induction galvanometer as recited in claim 2, in combination with a core assembly within said interpolar gap and inside said coil; said coil assembly including soft iron sections at opposite sides of a high resistance ferromagnetic material insert alined with the inserts in the slots of said soft iron bars.

4. An induction galvanometer as recited in claim 3, wherein said means for superposing a high frequency magnetic flux includes means adjustable to control the relative magnitudes of the high frequency magnetic flux in the air gaps between said core assembly and the respective spaced polar surfaces of said magnetic field structure.

5. An induction galvanometer as recited in claim 3, wherein said means for superposing a high frequency flux includes means for establishing a high frequency current around said inserts in said soft iron bars.

6. An induction galvanometer as recited in claim 3, wherein said means for superposing a high frequency flux includes means for establishing a high frequency current around said insert of said core assembly.

7. An induction galvanometer comprising a permanent magnet field assembly with spaced pole pieces of soft iron and a soft iron core between said pole pieces, a coil supported for pivotal movement with the opposite sides thereof in the air gaps between said core and said pole pieces, said pole pieces and core being slotted in the direction of the magnetic flux path, inserts of high resistance ferromagnetic material in the slots of the pole pieces and core, and means for establishing an alternating magnetic flux in said inserts and across said air gaps.

8. An induction galvanometer as recited in claim 7, wherein said means includes a pair of coils, and means energized by the respective coils for establishing an alternating magnetic flux across the individual air gaps.

9. An induction galvanometer as recited in claim 8, in combination with means for tuning said coils to resonance at a desired source frequency.

10. An induction galvanometer as recited in claim 9, wherein said tuning means includes ferromagnetic cores, and means supporting said cores for adjustment to a desired extent into the respective coils of said pair.

11. An induction galvanometer as recited in claim 8, in combination with means for adjusting the relative impedance values of said coils to control the relative magnitudes of the alternating magnetic flux through the individual air gaps.

12. An induction galvanometer as recited in claim 8, wherein said coils are connected in series, in combination with means individual to the respective coils and adjustable to determine the individual and total impedances thereof.

13. An induction galvanometer as recited in claim 7, wherein said means includes a pair of coils, and means including U-shaped brackets supporting said coils upon said pole pieces and core.

14. An induction galvanometer as recited in claim 13, wherein the ends of said U-shaped brackets are secured to sections of said pole pieces and core at opposite sides of the inserts therein, whereby said brackets constitute one turn coupling links for said coils to establish an alternating current around said inserts.

15. An induction galvanometer as recited in claim 13, in combination with means for adjusting the relative magnitudes of the alternating magnetic flux in the air gaps of said magnetic field assembly.

16. An induction galvanometer of the type including a magnetic field structure having spaced polar surfaces between which a unidirectional magnetic flux is established, a coil supported for angular displacement in the gap between said polar surfaces in response to direct current traversing said coil, means for superposing a high frequency alternating magnetic flux upon the unidirectional magnetic flux traversing said interpolar gap, and a core assembly within said interpolar gap and inside of said coil, said core assembly including sections of different magnetic characteristics constituting parts of substantially separate paths in parallel between said spaced polar surfaces for the unidirectional magnetic flux and for the alternating magnetic flux.

ROSWELL W. GILBERT.

References Cited in the file of this patent

UNITED STATES PATENTS

| Number | Name | Date |
|---|---|---|
| 2,241,912 | Kersten et al. | May 13, 1941 |
| 2,355,298 | Horlacher | Aug. 8, 1944 |
| 2,405,049 | Pattee | July 30, 1946 |
| 2,485,657 | Rex | Oct. 25, 1949 |
| 2,536,260 | Burns | Jan. 2, 1951 |